Sept. 10, 1929.  A. E. OSTRANDER ET AL  1,727,667
ARTICULATED CAR
Filed Jan. 4, 1928    3 Sheets-Sheet 1
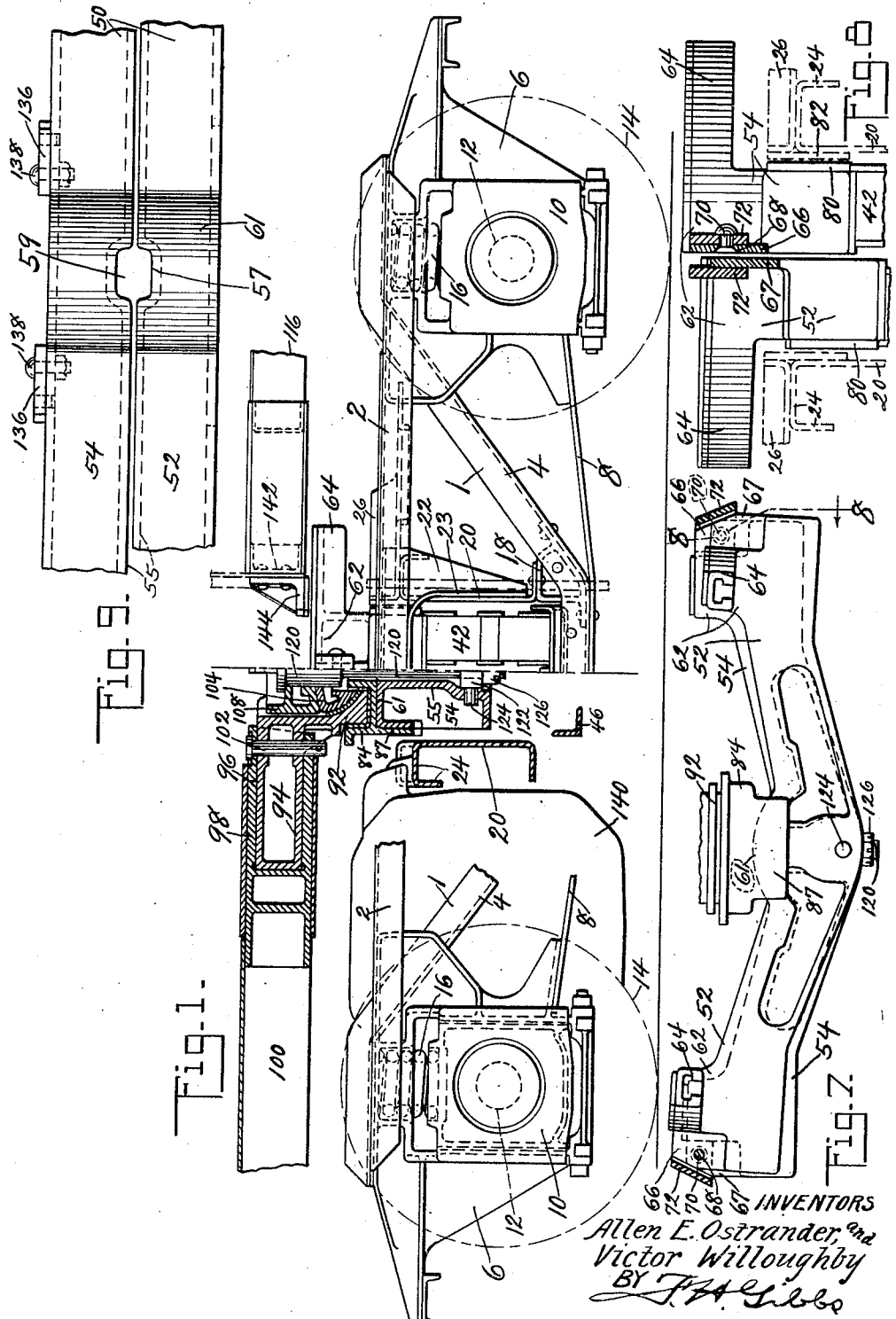

Sept. 10, 1929.  A. E. OSTRANDER ET AL  1,727,667
ARTICULATED CAR
Filed Jan. 4, 1928  3 Sheets-Sheet 2
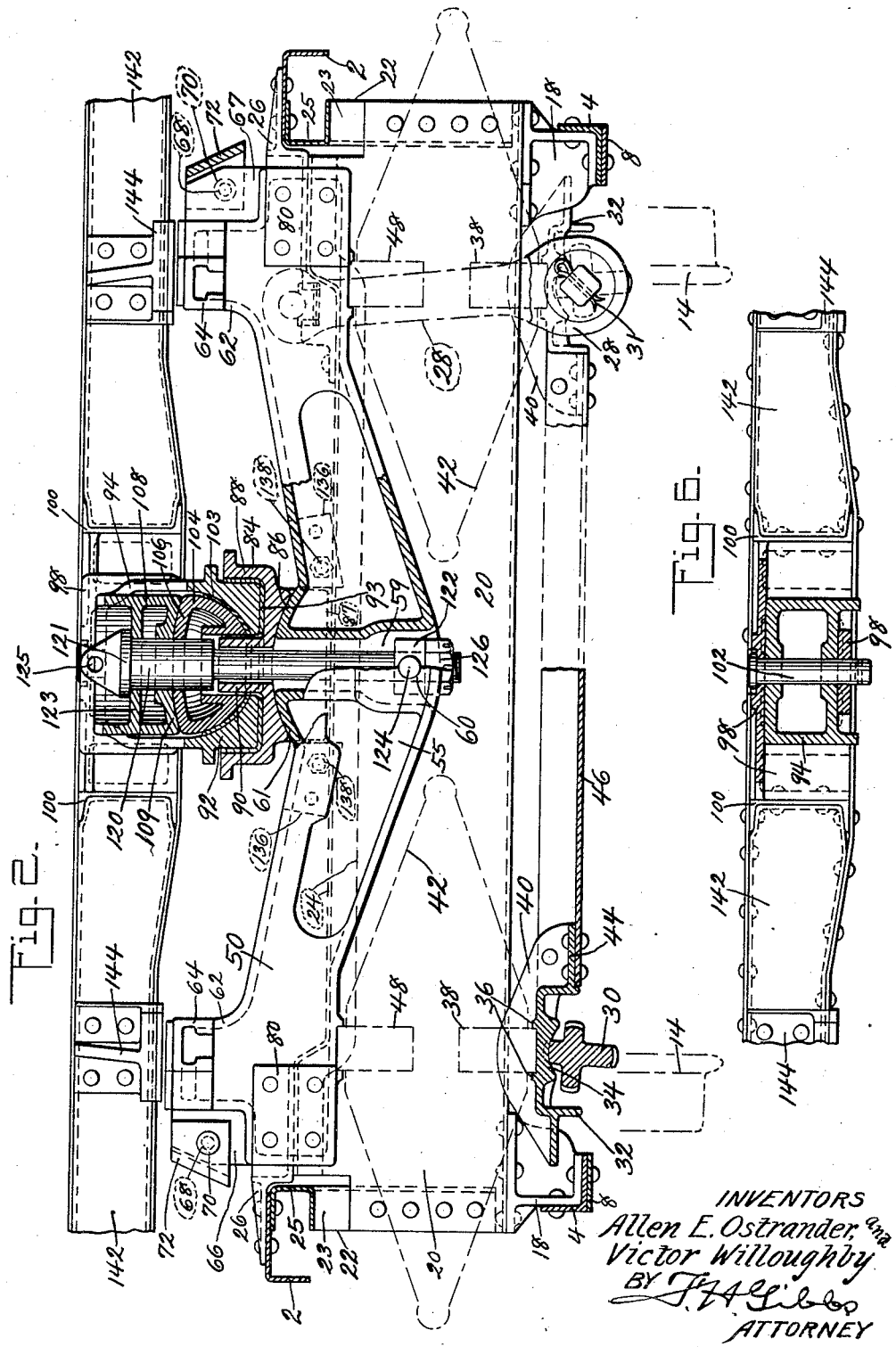
INVENTORS
Allen E. Ostrander, and
Victor Willoughby
BY
ATTORNEY

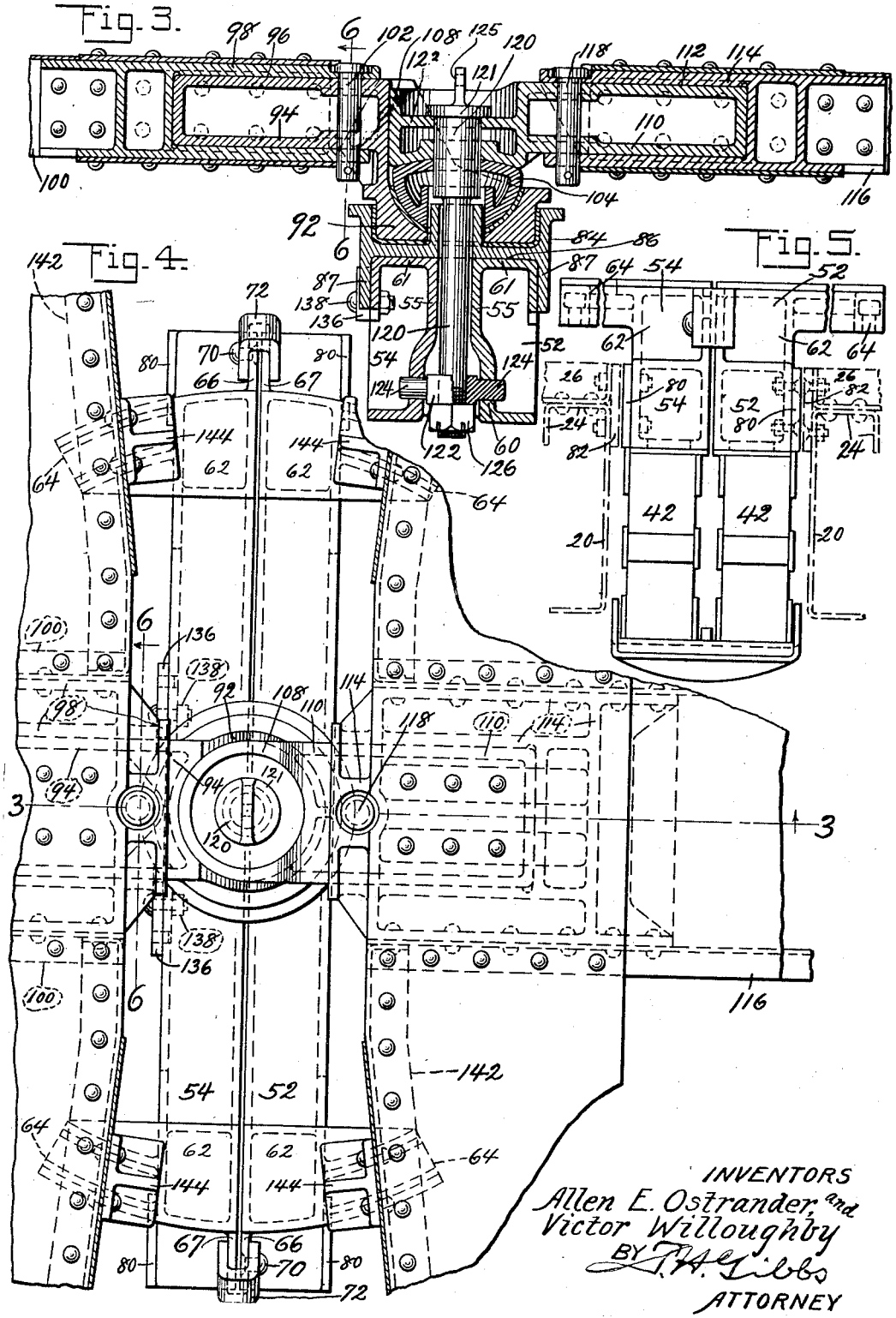

Patented Sept. 10, 1929.

1,727,667

UNITED STATES PATENT OFFICE.

ALLEN E. OSTRANDER, OF BRONXVILLE, NEW YORK, AND VICTOR WILLOUGHBY, OF RIDGEWOOD, NEW JERSEY, ASSIGNORS TO AMERICAN CAR AND FOUNDRY COMPANY, OF NEW YORK, N. Y., A CORPORATION OF NEW JERSEY.

ARTICULATED CAR.

Application filed January 4, 1928. Serial No. 244,399.

Reference is had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In the drawings:

Figure 1 is a view of the means for supporting the adjacent ends of the car bodies of an articulated car constructed in accordance with this invention, the portion of the figure to the right of the center line showing the truck with its bolster member and side bearing and portion of the car underframe in side elevation, while the portion of the figure to the left shows a portion of the truck in side elevation and a partial central vertical longitudinal section of the car underframe and truck;

Fig. 2 is a view of the structure shown in Fig. 1, showing some parts in vertical transverse section and other parts in elevation;

Fig. 3 is a central vertical longitudinal section taken as on the line 3—3 of Fig. 4;

Fig. 4 is a partial transverse horizontal section taken just above the car underframes and showing in plan view the ends of the car underframe, the truck bolster and the center and side bearings;

Fig. 5 is a broken end elevation of the truck bolster, its supporting springs and spring plank, the transoms being indicated by broken lines;

Fig. 6 is a vertical transverse section taken on the line 6—6 of Figs. 3 and 4;

Fig. 7 is a view of the truck bolster detached from the truck, the sections of the bolster being shown as shifted relatively to each other and the clips for preventing separation of the bolster sections being shown in section;

Fig. 8 is a section taken on the line 8—8 of Fig. 7; and

Fig. 9 is a partial top plan view of the bolster.

It is an object of this invention to provide an improved articulated car construction in which a pair of relatively movable bolster sections individually support the side bearings for the respective car ends, and jointly support a center bearing which is a common support for both car ends. It is also an object of this invention to provide an improved articulated car construction comprising a connection between the car underframes particularly adapted for use in connection with the truck center bearing above-mentioned to permit relative movement of the car bodies and which will permit of the ready separation of the bodies without an excessive lifting of either body and the separate parts of which may be readily secured to and disconnected from the individual underframes.

In the drawings, the invention is shown in connection with a truck of suitable construction, comprising side frames 1 having compression members 2 and tension members 4 which are secured together at their ends and secured to pedestals 6. The pedestals are joined by the tie bars 8 which pass beneath and are secured to the tension members 4 at the center of the truck. Mounted in the pedestals 6 are the journal boxes 10 in which are journaled the axles 12 carrying the wheels 14, the journal boxes 10 supporting the side frames by means of springs 16. Brackets 18 are mounted on the tension members 4 adjacent the centers thereof and on the corresponding brackets of the opposite tension members are secured the transoms 20 which connect the side frames together. The corresponding ends of the transoms 20 are joined by the members 22 having angular legs 23 which are connected to the transoms 20 and are connected by channel shaped cross pieces 25 having one flange fastened to the compression members 2 of the side frame. The upper edges of the transoms 20 except where cut away to receive the members 22 are provided with outwardly and downwardly projecting flanges 24, the horizontal portions of which are secured at their ends to brackets 26 which are also secured to the compression members 2 and the members 22. Mounted on the brackets 26 are swing links 28 connected at their lower ends by the adjustable spring plank supports 30, the ends of which extend through openings in the swing links and are secured therein by the pins 31. Mounted on the supports 30 are the spring seats 32 having the curved surfaces 34 for engagement with the supports 30 and projecting lugs 36 which engage upon opposite sides of the spring clips 38. The spring seats 32 are also provided with the flanges 40 which extend upon opposite sides of the elliptical springs 42 and extend to and are secured to flanges 44, the flanges 44 and the inner ends of the flanges 40 of the spring seats 32 at opposite sides of the truck being connected by the oppositely disposed angles 46 to form the spring plank.

Extending from side to side of the truck and having its opposite ends engaging the spring clips 48 which secure the upper portions of the springs 42 together is a bolster 50 comprising a plurality of similar but oppositely disposed sections 52 and 54, the individual bolster sections being independently supported upon separate springs 42 as shown in Figs. 1 and 5 or upon separate groups of springs where additional springs are required. Each of the bolster sections is substantially rectangular at its ends and channel-shaped at its center and the bolster sections are arranged so that the webs 55 are together at the centers of the bolsters. The center portion of each bolster section is depressed below the end portions and has its web curved inwardly into the body of the bolster section as at 57 so that when two sections are placed together there is formed an opening 59 of the full depth of the web and elongated in the direction of the length of the bolster. At the center of the bolster sections, the web is of greater height and is so shaped that the upper surface of the bolster section forms an arc as at 61 having its center of curvature in the axis of the opening 60 in the web 55. Formed integral with the bolster sections adjacent each end thereof are side bearings 62 which project above the level of the ends of the bolster sections and have outwardly projecting portions 64 formed integral therewith. At the ends, the inner or adjacent webs 55 of the sections are extended to form flanges 66 and 67 which extend between the bolster ends and side bearings 62. The flanges 66 are provided with perforations 68 through which pass rivets 70 which secure the U-shaped clips 72 to the flanges 66. The rivets 70 and clips 72 serve to secure the bolster sections together while at the same time permitting of relative movements of the bolster sections. If desired, the U-shaped clips 72 may also be made integral with the flanges 66 thereby dispensing with the rivets 70. At each end, each bolster section is provided with a wear plate 80 which engages a corresponding wear plate 82 secured to the transoms 20 and brackets 26.

Mounted upon the arc-shaped portions 61 of the bolster sections is a truck center bearing 84 arc-shaped as at 86 to conform to the shape of the bolster sections and provided with downwardly projecting flanges 87 which engage with the flanges of the bolster sections and aid in retaining the bearing 84 on the bolster as well as in holding the bolster sections together. The bearing 84 is also provided with an inner circular flange 90 which surrounds an opening in the center of the center bearing and an outer circular flange 88 which, with the flange 90, defines a flat annular seat in which is supported a body bearing 92 provided with an opening to receive the flange 90, suitable bearing lining 93 being placed between the truck and body center bearings. The body bearing 92 is formed integral with a body bearing bracket 94 of substantially rectangular shape which is received in a pocket 96 of a pocket casting 98 mounted between the ends of the longitudinal sills 100 of the underframe of one of the car sections supported by the truck. A pin 102 passing through openings in the casting 96 and bracket 94 secures the bracket 94 in position in the casting 96. The body center bearing 92 is formed with a concave upper surface 103 in which is mounted a filler block 104 shaped to fit the surface of the center bearing and provided with an opening to receive the flange 90. The filler block 104 has a convex upper surface 106 upon which is mounted a body center bearing 108 having a surface 109 conforming to the surface 106 and formed integral with a bearing bracket 110 which fits in a pocket 112 of a pocket casting 114 mounted between the longitudinal sills 116 of the underframe of the other car section on this truck. The body bearing bracket 110 is secured in position in the pocket casting 114 by a pin 118. Each of the underframes comprises end sills 142 to which are secured body side bearings 144 which engage the respective side bearings 62 and the extensions 64 thereof.

Openings in the body center bearing 108 and the openings in the filler block 104 and body center bearing 92 aline with the opening in the truck center bearing 84 and with the openings 59 formed by the inwardly curved portions of the webs 55 of the bolster sections. Extending through the alined openings is a king pin or bolt 120 having a head 121 resting upon a web 123 of the body center bearing 108 and provided with an eye 125 for use in removing the pin. Adjacent the head 121, the body of the pin 120 for a portion of its length is of a diameter to fit in the openings in the body center bearing 108 and filler block 104 so as to prevent undue play between the bearing 108 and the filler block. The remainder of the body of the pin 120 is of less diameter and fits the opening in the truck center bearing 84 and the opening 59 formed in the bolster, there being sufficient clearance to permit ready movement of the pin 120 in the direction of the length of the opening 59. The lower end of the pin 120 projects through a collar 122 provided with trunnions 124 which engage in the openings 60 in the webs 55 of the bolster sections. A nut 126 threaded on the lower end of pin 120 secures the pin in position and secures the body center bearings 92 and 108, the filler block 104 and truck center bearing 84 together and to the bolster 50.

Removal of the pin 120 will permit of the separation of the car sections by removing the center bearing 108 from the filler block 104, an operation which involves but a slight elevation of the car section. The filler block 104 may then be removed and the body center bearing 92 removed from the truck center bearing 84, an operation which will require but the usual elevation of the car section.

Mounting the king pin 120 in the pivotally mounted collar 122 gives a construction which permits of the independent pivotal movement of the bolster sections about the trunnions 124 as an axis, the truck center bearing 84 traveling on the arc-shaped portions 61 of the bolster sections and the pin traveling in the opening 59. Stops 136 secured to the web 55 of one of the bolster sections by the bolts 138 limits the movement of the truck center bearing 84 with respect to that bolster section while leaving the other bolster section free with respect to the truck center bearing.

Mounting the individual bolster sections upon independent springs or groups of springs permits of independent movement of the ends of the bolster sections so that the car bodies engaging the respective side bearings may rock with respect to each other, this rocking movement being permitted by the shape of the engaging surfaces of the body center bearings and filler block and the engaging surfaces of the body sections and truck center bearing.

It will be noted that the body center bearing 108 in Fig. 3 abuts the forward end of the center bearing brackets 94 so that buffing stresses are transmitted directly through the bearing bracket 94 and center bearing 108 and through the bearing brackets and pocket castings to the underframes without exerting any stresses upon the pin 120 and pins 102 and 118. It will also be noted that the pin 120 forms a secure connection between the bolster and the body center bearings so that the driving stresses may be transmitted from the motor 140 through the bolster to the underframes of the cars. It will also be noted that while the opening 59 permits of movement of the king pin 120 longitudinally of the bolster, movement of the pin 120 transversely of the bolster is prevented by the webs 55.

What is claimed is:

1. In a car construction, a bolster comprising relatively movable pivotally connected sections and a truck center bearing holding said sections together.

2. In a car construction, a bolster comprising relatively movable pivotally connected sections and a truck center bearing engaging both of said sections.

3. In a car construction, a bolster comprising relatively movable pivotally connected sections, a truck center bearing carried by said bolster and movable with respect to both of said bolster sections.

4. In a car construction, a bolster comprising relatively movable pivotally connected sections and truck side bearings on each of said sections.

5. In a car construction, a bolster comprising relatively movable pivotally connected sections, a truck center bearing carried by said bolster and truck side bearings on each of said sections.

6. In a car construction, a bolster comprising relatively movable sections and a truck center bearing movably supported on said bolster sections and having flanges holding said sections together.

7. In a car construction, a bolster comprising relatively movable sections and a truck center bearing supported on said bolster in engagement with said sections.

8. In a car construction, a bolster comprising relatively movable sections having arc-shaped portions and a truck center bearing mounted on said arc-shaped portions.

9. In a car construction, a bolster comprising a plurality of sections having arc-shaped portions and a truck center bearing mounted on said arc-shaped portions, said bolster sections being independently movable with respect to said center bearing.

10. In a car construction, a bolster comprising relatively movable pivotally connected sections, a truck center bearing carried by said bolster and movable with respect to said bolster sections, and truck side bearings on each of said sections.

11. In a car construction, a bolster comprising relatively movable pivotally connected sections, a truck center bearing carried by said bolster and a plurality of car bodies supported on said center bearings.

12. In a car construction, a bolster comprising relatively movable pivotally connected sections, truck side bearings on each of said sections and a car body engaging the side bearings of each bolster section.

13. In a car construction, a bolster comprising relatively movable pivotally connected sections, a center bearing carried by said bolster, a plurality of car bodies, and center bearings secured to said bodies and supported by said truck center bearing.

14. In a car construction, a bolster comprising relatively movable pivotally connected sections, a center bearing carried by said bolster, a plurality of car bodies, center bearings secured to said bodies and supported by said truck center bearing and a filler block between said body center bearings.

15. In a car construction, a bolster comprising relatively movable pivotally connected sections, a center bearing carried by said bolster, a plurality of car bodies, center bearings secured to said bodies and supported by said truck center bearing, a filler block between said body center bearings and means securing said center bearings to each other and to said bolster permitting relative movements of said center bearings and bolster.

16. In a car construction, a truck center bearing, a body center bearing mounted in said truck center bearing, a filler block mounted in said body center bearing, a second body center bearing mounted on said filler block and a king pin securing said center bearings and filler block together.

17. In a car construction, a truck center bearing, a body center bearing mounted in said truck center bearing, a filler block mounted in said body center bearing, a second body center bearing mounted on said filler block, said body center bearings being movable relatively to each other and to said truck center bearing and a king pin securing said center bearings and filler block together.

18. In a car construction, a bolster comprising relatively movable pivotally connected sections, a center bearing carried by said bolster, a plurality of car body underframes having pockets in the ends thereof, body center bearing brackets mounted in said pockets, and body center bearings on said brackets supported by said truck center bearing.

19. In a car construction, a truck center bearing, a plurality of underframes, pocket members mounted in the ends of said frames, body center bearing brackets detachably mounted in said pocket members, and body center bearings on said brackets and supported on said truck center bearing.

20. In a car construction, an underframe having spaced longitudinal sills, a pocket member secured to said sills, a body center bearing bracket mounted in said pocket member and a body center bearing on said bracket.

In witness whereof we have hereunto set our hands.

ALLEN E. OSTRANDER.
VICTOR WILLOUGHBY.